(12) United States Patent
Kelley

(10) Patent No.: US 11,542,745 B1
(45) Date of Patent: Jan. 3, 2023

(54) VEHICLE WINDOW CONTROL UNIT

(71) Applicant: Katherine J. Kelley, Rainier, OR (US)

(72) Inventor: Katherine J. Kelley, Rainier, OR (US)

( * ) Notice: Subject to any disclaimer, the term of this patent is extended or adjusted under 35 U.S.C. 154(b) by 194 days.

(21) Appl. No.: 17/066,572

(22) Filed: Oct. 9, 2020

(51) Int. Cl.
| | | |
|---|---|---|
| *E05F 15/77* | (2015.01) | |
| *B60R 16/00* | (2006.01) | |
| *B60R 16/02* | (2006.01) | |

(52) U.S. Cl.
CPC ............ *E05F 15/77* (2015.01); *B60R 16/005* (2013.01); *B60R 16/0207* (2013.01); *E05Y 2400/45* (2013.01); *E05Y 2400/66* (2013.01); *E05Y 2400/85* (2013.01); *E05Y 2900/55* (2013.01)

(58) Field of Classification Search
CPC .... E05F 15/77; B60R 16/005; B60R 16/0207; E05Y 2400/45; E05Y 2400/66; E05Y 2400/85; E05Y 2900/55
See application file for complete search history.

(56) References Cited

U.S. PATENT DOCUMENTS

| | | | |
|---|---|---|---|
| 5,572,101 | A | 11/1996 | Rutkowski et al. |
| 6,115,966 | A | 9/2000 | Shibata |
| 6,756,754 | B2 | 6/2004 | Bent et al. |
| 7,262,375 | B2 * | 8/2007 | Sakai ................. H01H 13/7057 |
| | | | 200/5 R |
| 9,579,955 | B2 | 2/2017 | Snider |
| 9,804,776 | B2 | 10/2017 | Ko et al. |
| 10,041,286 | B2 | 8/2018 | Jergess |
| 2005/0057912 | A1 * | 3/2005 | Hardt .................... H02B 1/36 |
| | | | 361/826 |
| 2011/0190962 | A1 * | 8/2011 | Peterson .................. G06F 7/00 |
| | | | 701/2 |
| 2018/0334117 | A1 * | 11/2018 | Matsunaga ............. B60R 16/02 |
| 2018/0361955 | A1 * | 12/2018 | Lange ...................... E05B 85/08 |
| 2019/0111866 | A1 * | 4/2019 | Ito .......................... B60R 16/02 |
| 2020/0149340 | A1 * | 5/2020 | Aoshima ............... E05F 15/695 |
| 2021/0268938 | A1 * | 9/2021 | Lindsay ................. B60N 2/005 |

OTHER PUBLICATIONS

One Touch Up/Down Windows. Forum [online]. VerticalScope Inc. [retrieved on Nov. 1, 2019]. Retrieved from the Internet: <URL: https://www.focusfanatics.com/threads/one-touch-up-down-windows.263025/>.

Thread: One Touch Close Rear Windows on Coupe & NAV Language Set. Forum [online]. Copyright © 2020 vBulletin Solutions, Inc. [retrieved on Nov. 1, 2019], Retrieved from the Internet: <URL: https://www.bimmerforums.com/forum/showthread.php?1463145-One-Touch-Close-Rear-Windows-on-Coupe-amp-NAV-Language-Set>.

DIY: Coupe Rear Windows One Touch Close. Forum [online]. VerticalScope Inc. [retrieved on Nov. 1, 2019]. Retrieved from the Internet: <URL: https://www.e46fanatics.com/threads/diy-coupe-rear-windows-one-touch-close.783164/t>.

* cited by examiner

*Primary Examiner* — Jared Fureman
*Assistant Examiner* — Aqeel H Bukhari
(74) *Attorney, Agent, or Firm* — Cramer Patent & Design, PLLC; Aaron R. Cramer

(57) ABSTRACT

A vehicle control unit kit is a plug-n-play OEM harness configured to interface with a given vehicle's OEM window switch connector. The device is configured to enable the given vehicle's power window master switch driver to operate all vehicle windows. The vehicle control unit additionally incorporates smart avoid anti-pinching programming.

15 Claims, 5 Drawing Sheets

VEHICLE WINDOW CONTROL UNIT

RELATED APPLICATIONS

Non-Applicable.

FIELD OF THE INVENTION

The present invention relates generally to a control unit and more specifically to a vehicle window control unit.

BACKGROUND OF THE INVENTION

A standard or optional accessory on many late model vehicles equipped with power windows is the automatic up/down or express feature. This feature allows the vehicle occupant to simply touch the window switch control one time to command the power window to travel all the way down or all the way up depending on the current position of the window and which switch (up or down) is pressed. Such an accessory is very useful and frees the user's hands for other needs.

However, such functionality is not available on all makes and models of vehicles and may not be available on all windows as it may be made available on only the driver's window. Other features such as control by a remote-control fob and/or object avoidance to prevent crushing of arms, fingers or other inadvertent objects in the windows path are often omitted or not available on certain model vehicles. Accordingly, there exists a need for a means by which an advanced vehicle power window functionality can be provided to all power windows via an aftermarket device. The development of the vehicle window control unit fulfills this need.

SUMMARY OF THE INVENTION

The principles of the present invention provide for a power window control module which has an enclosure containing a single circuit board, a first wiring harness and a second wiring harness connecting a plurality of electrical inputs and outputs with a corresponding first connector and a corresponding second connector and a third wiring harness terminating into a third connector within the enclosure. The first wiring harness and the second wiring harness are combined into the third wiring harness. The power window control module also has a restraint strap which is provided on either the first wiring harness or the second wiring harness.

The enclosure may be located within a distance of a window switch to provide an up and down motion of the vehicle window when the window switch is in a maintained position. The maintained position is maintained with a user's finger which is adapted to the window switch during motion of the vehicle window. The first wiring harness and the second wiring harness along with the corresponding first connector and the corresponding second connector may be located such that they are in close physical proximity to the window switch for convenience and accessibility. The first connector may be supplied as original equipment manufacturer as part of the wiring to the window switch. The second connector half may be connected to the first connector and a plurality of other electrical elements. The restraint strap may be provided on the first wiring harness and the second wiring harness. The restraint strap may be equipped with a hook-and-loop-type fastener to secure the power window control module. The restraint strap may be made of nylon.

The power window control module may automatically raise and lowers a motor vehicle window. The radio frequency signal controls all of a plurality of the vehicle windows down from the wireless key fob, all of the vehicle windows up from the wireless key fob, all of the vehicle windows down from the driver's door master switch located on a driver's vehicle door, and all of the vehicle windows up from the driver's door master switch located on the driver's side door.

The power window control module may be installed inside of a vehicle door. The enclosure may be located within the door switch cover where it will not interfere with functionality of the vehicle door or a plurality of vehicle door components. The power window control module may be installed within four of the vehicle doors of the motor vehicle. The power window control module may be installed A plurality of the power window control modules may communicate with each other. The power window control module may communicate with a wireless key fob via with an internal radio transmitter. The wireless key fob may utilize a radio frequency signal to eliminate running additional conductors throughout the motor vehicle saving time and money.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
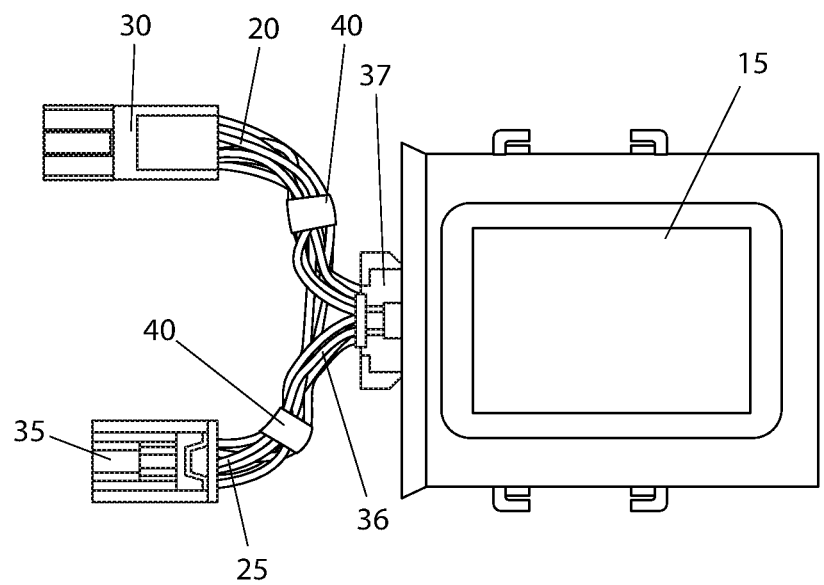
FIG. 1 is a pictorial view of the power window control module, according to the preferred embodiment of the present invention.

DESCRIPTIVE KEY 10 power window control module
15 enclosure
20 first wiring harness
25 second wiring harness
30 first connector
35 second connector
36 third wiring harness
37 third connector
40 restraint strap
45 vehicle door
50 door switch cover
65 window switch
90 motor vehicle
95 radio transmitter
100 wireless key fob
105 radio frequency (RF) signal 110 driver's door master switch
115 driver's door
120 first connector half
125 second connector half
130 main header
135 power regulating circuit
140 internal antenna
145 comparator circuit
150 main controller circuit
155 relay circuit
160 relay

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a pictorial view of the power window control module 10, according to the preferred embodiment of the present invention is disclosed. The power window control module 10 (herein also described as the "module") 10, provides the ability to easily install a module that permit auto up/down (express) functionality on a motor vehicle window. The module 10 consists of an enclosure 15 containing a single circuit board inside. Various electrical inputs and outputs are connected by a first wiring harness 20 and a second wiring harness 25 with a corresponding first connector 30 and second connector 35. The first wiring harness 20 and the second wiring harness are combined into a third wiring harness 36 and terminate into a third connector 37. The third connector then terminates in the enclosure 15. A restraint strap 40 is provided on either the first wiring harness 20, the second wiring harness 25, or both the first wiring harness 20 and the second wiring harness 25. The restraint strap 40 is envisioned to be made of nylon material and equipped with a hook-and-loop-type fastener to aid of securement of the module 10 as will be described in greater detail hereinbelow.

Figure 2:
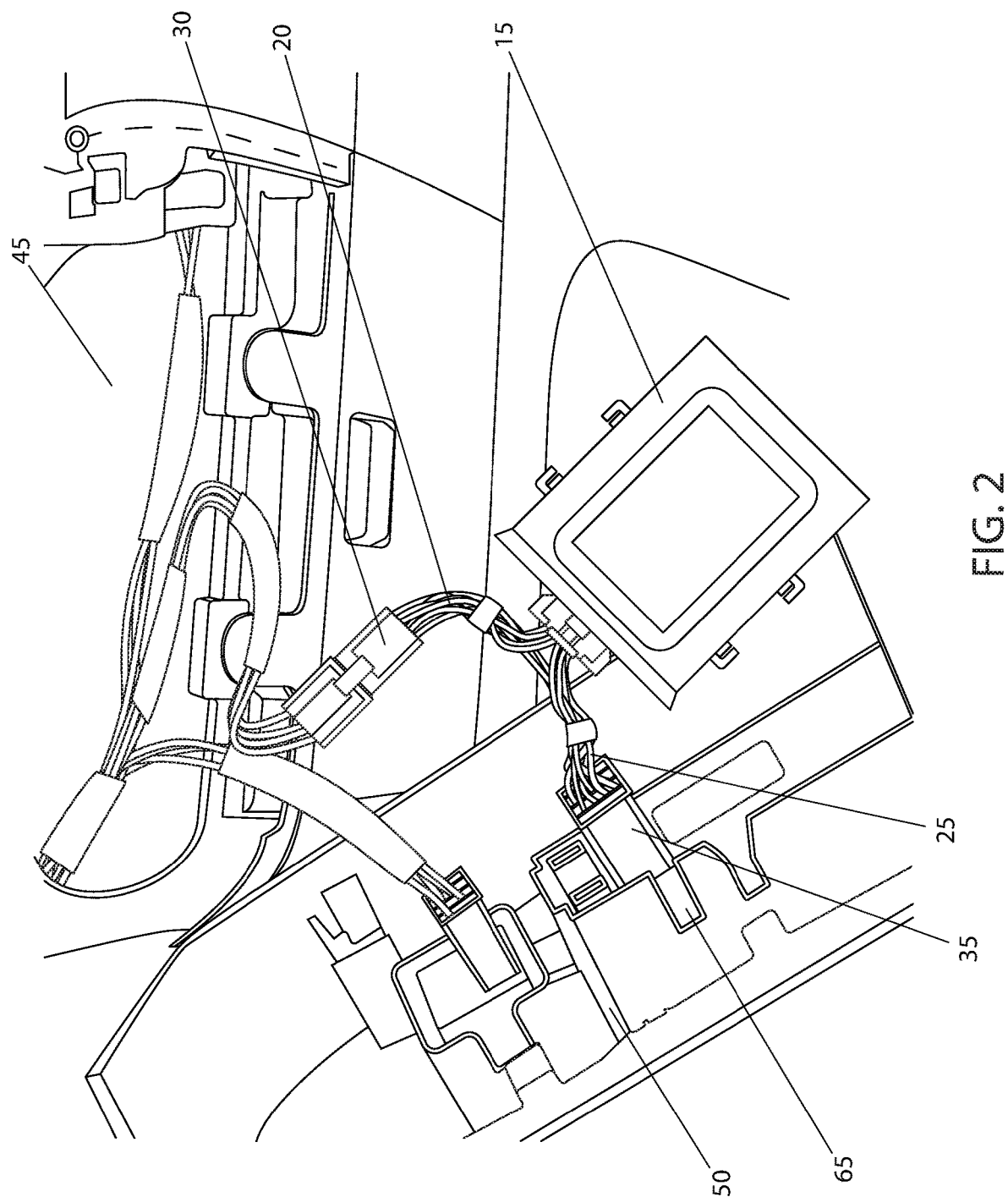
FIG. 2 is a perspective view of the power window control module shown in an installed state inside of a vehicle door, according to the preferred embodiment of the present invention.

Referring next to FIG. 2, a perspective view of the module 10 shown in an installed state inside of a vehicle door 45, according to the preferred embodiment of the present invention is depicted. The vehicle door 45 is shown in a disassembled state with the door switch cover 50 removed. The enclosure 15 is located within the door switch cover 50 where it will not interfere with functionality of the door or the door components. The enclosure 15 is located within an acceptable distance of the window switch 65 which is envisioned to provide up/down motion of the vehicle window when the window switch 65 is in a maintained position (with the user's finger on the window switch 65 during the entire time of motion of the vehicle window). It is noted that the vehicle door 45 shown is representative only and can be on the driver's or passenger's side of the vehicle in either a forward or rearward position. The first wiring harness 20 and second wiring harness 25 along with the corresponding first connector 30 and second connector 35 (all of which are as shown in FIG. 1) are located such that they are close physical proximity to the window switch 65.

Figure 3:
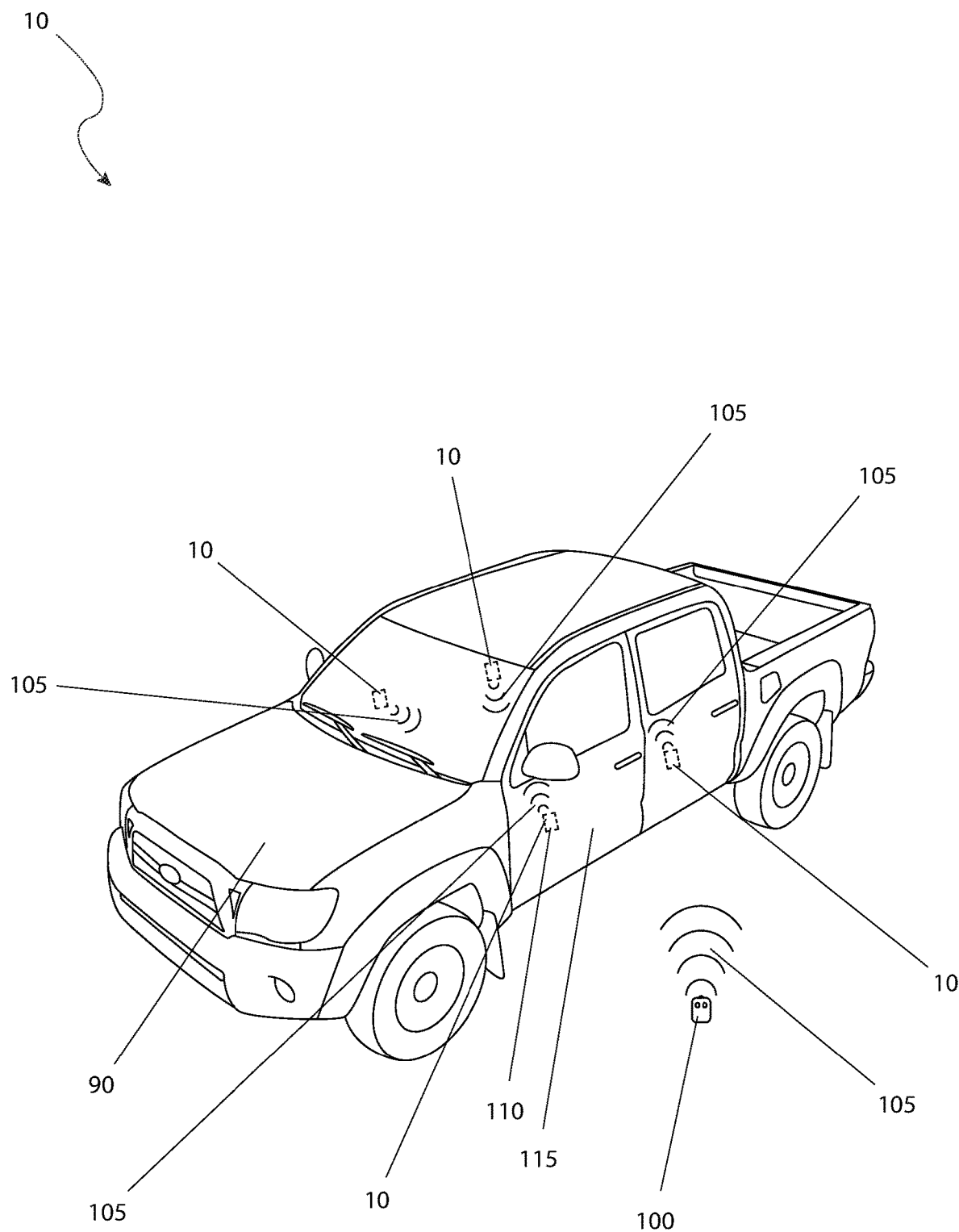
FIG. 3 is a perspective view of power window control module shown in an installed state on a motor vehicle, according to the preferred embodiment of the present invention.

Referring now to FIG. 3, a perspective view of module 10 shown in an installed state on a motor vehicle 90, according to the preferred embodiment of the present invention is shown. The module 10 is shown being installed on four (4) vehicle door 45 of the motor vehicle 90. The motor vehicle 90 is depicted as a pickup truck for purposes of illustration. However, the module 10 is capable of being installed on any make or model of truck, automobile or vehicle equipped with power windows. As such, the type of vehicle intended for use with the module 10 is not intended to be a limiting factor of the present invention. The module 10 is equipped with an internal radio transmitter 95 (not shown in this figure due to illustrative limitations). This allows the module 10 to communicate with each other, as well as with a wireless key fob 100. The communication is accomplished by a radio frequency (RF) signal 105. This communication incorporates functionality including but not limited to: all windows down from the wireless key fob 100, all windows up from the wireless key fob 100, all windows down from the driver's door master switch 110 located on the driver's door 115, and all windows up from the driver's door master switch 110 located on the driver's door 115. The utilization of a radio frequency (RF) signal 105 eliminates the necessity of running additional conductors (wiring) throughout the motor vehicle 90, thus saving time and money.

Figure 4:
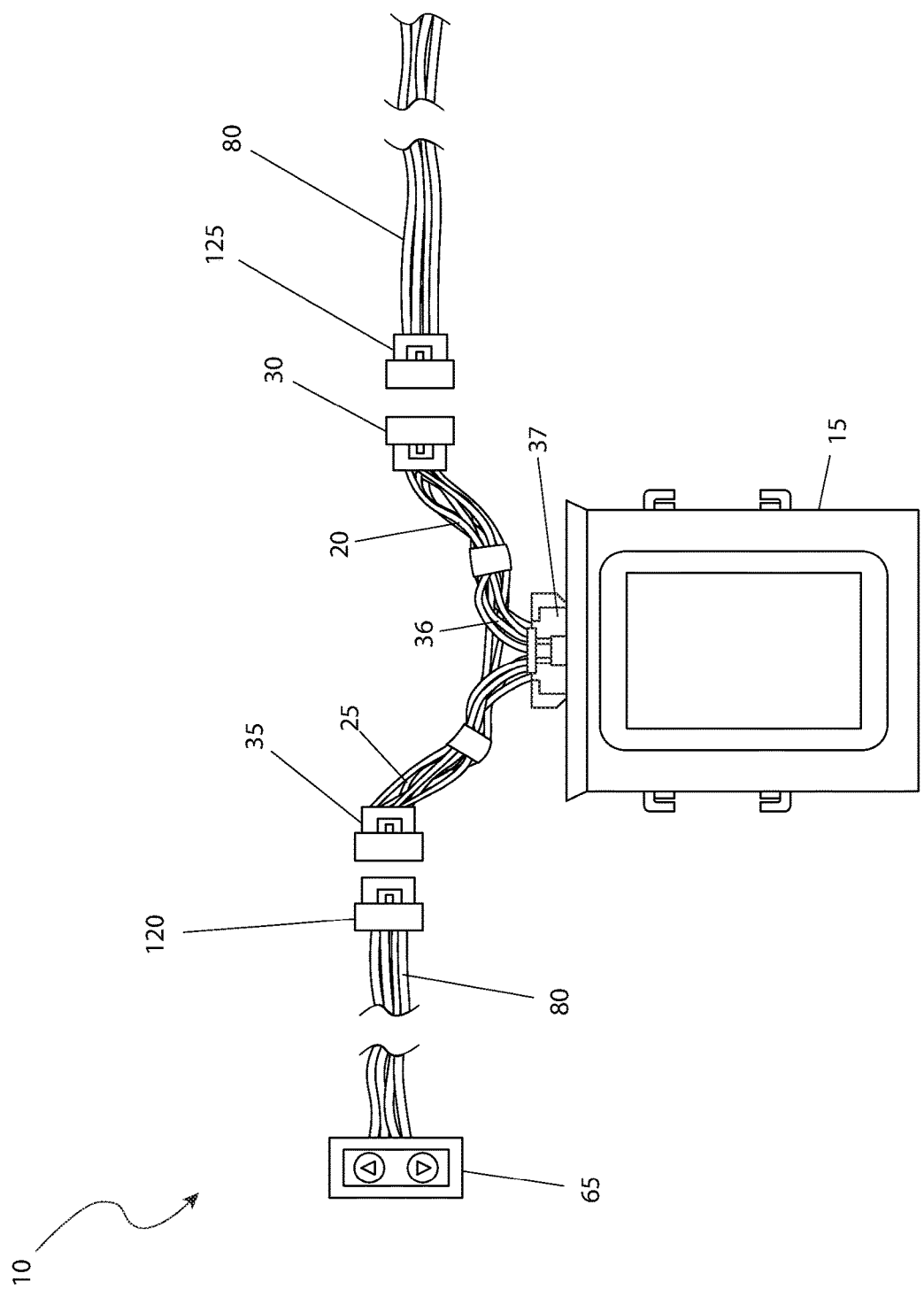
FIG. 4 is a wiring diagram of the power window control module, according to the preferred embodiment of the present invention; and, FIG. 5 is an electrical block diagram of the power window control module, according to the preferred embodiment of the present invention.

Referring next to FIG. 4, a wiring diagram of module 10, according to the preferred embodiment of the present invention is disclosed. The first connector half 120 and a second connector half 125 are shown in a disconnected state. The second connector 35 is then inserted into the first connector half 120 and the first connector 30 is inserted into the second connector half 125. The first wiring harness 20 and the second wiring harness 25 combine into the third wiring harness 36 and terminate at a third connector 37 which connects to the enclosure 15. The first connector half 120 is supplied as Original Equipment Manufacturer (OEM) as part of the wiring to the window switch 65. The second connector half 125 is then connected to the first connector 30 (as shown in FIG. 2), and other electrical elements.

Figure 5:
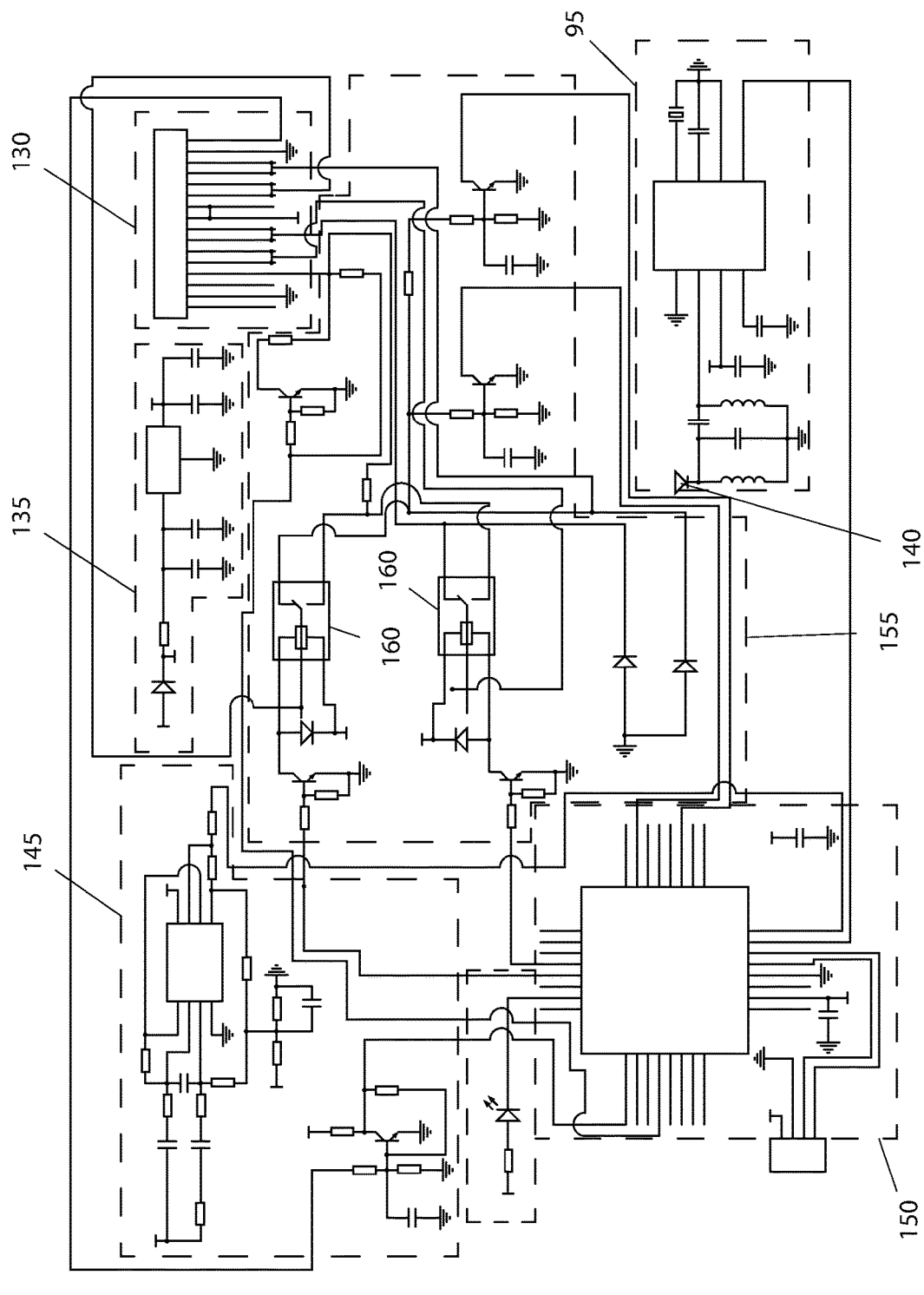

Referring now to FIG. 5, an electrical block diagram of the power window control module 10, according to the preferred embodiment of the present invention is depicted. Incoming electrical signals from the first wiring harness 20 (as shown in FIG. 1) and the second wiring harness 25 (as shown in FIG. 1) enter at a main header 130. A power regulating circuit 135 produce regulated 12 VDC and 5 VDC for use by the balance of the circuit. The radio transmitter 95 uses an internal antenna 140 to pick up the radio frequency (RF) signal 105 (as shown in FIG. 3). a comparator circuit 145 senses voltage drop encountered when the window glass encounters a blockage such as an arm, child, pet, or other blockage and instantly reverses the window glass 70 to prevent injury. The functionality of the power window control module 10 is governed by a main controller circuit 150 that is preloaded with software to allow for the above described functionality. Finally, a relay circuit 155 operates two (2) that govern the up/down operation of the window glass.

2. Operation of the Preferred Embodiment

The preferred embodiment of the present invention can be utilized by the common user in a simple and effortless manner with little or no training. It is envisioned that the module 10 would be constructed in general accordance with FIG. 1 through FIG. 5. The user would procure the module 10 from conventional procurement channels such as auto supply stores, auto sound system and alarm installers, mail order and internet supply houses and the like. Special attention would be paid to the make and model of the motor vehicle 90 upon which the power window control module 10 is to be installed as well as any enhanced functionality such as operation with an OEM wireless key fob 100, aftermarket wireless key fob 100, additional vehicle door 45 or the like.

After procurement and prior to utilization, the module 10 would be installed in the following manner: the user will remove the door switch cover 50 any vehicle door 45 in which the module 10 is to be installed; the first connector half 120 and the second connector half 125 are separated; the first connector 30 and the second connector 35 are then inserted into the door wiring harness 80; operation is verified; and the necessary door switch cover 50 are replaced. At this point in time, the module 10 is operational.

During utilization of the module 10, the following procedure would be initiated: the user can initiate operation of the module 10 via the respective window switch 65, the driver's door master switch 110 in the driver's door 115, or the wireless key fob 100. Various commands issued include but are not limited to auto (express) up or down for an individual window glass in any specific vehicle door 45 or all up or all down in the case of the driver's door master switch 110 or the wireless key fob 100. Should any blockage be detected, the module 10 will automatically reverse movement of the window.

In addition to the one-touch auto up/down functionality of the module 10, the following functionality is provided over conventional standard vehicle window control systems: ease of installation with minimum of tools; no modification or splicing of the door wiring harness 80; easy removal of the module 10, should its functionality no longer be desired, compatibility with any make and model vehicle; compatibility with OEM factory power window switches; and automatic reversal upon blockage detection.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A power window control module, comprising:
   an enclosure containing a single circuit board;
   a first wiring harness and a second wiring harness connecting a plurality of electrical inputs and outputs with a corresponding first connector and a corresponding second connector;
   a third wiring harness terminating into a third connector within the enclosure, the first wiring harness and the second wiring harness are combined into the third wiring harness; and
   a restraint strap provided on either the first wiring harness or the second wiring harness;
   wherein the enclosure is disposed adjacent to a window switch to provide an up and down motion of the vehicle window when the window switch is in a maintained position;
   wherein the maintained position with a user's finger adapted to the window switch during motion of the vehicle window;
   wherein the first wiring harness and the second wiring harness along with the corresponding first connector and the corresponding second connector are disposed adjacent to the window switch for convenience and accessibility; and
   wherein the first connector is supplied as Original Equipment Manufacturer as part of the wiring to the window switch.

2. The power window control module, according to claim 1, wherein the second connector half is connected to the first connector and a plurality of other electrical elements.

3. The power window control module, according to claim 1, wherein the restraint strap provided on the first wiring harness and the second wiring harness.

4. The power window control module, according to claim 1, wherein the restraint strap is equipped with a hook-and-loop-type fastener to secure the power window control module.

5. The power window control module, according to claim 1, wherein the restraint strap is made of nylon.

6. The power window control module, according to claim 1, wherein the power window control module automatically raises and lowers a motor vehicle window.

7. The power window control module, according to claim 6, wherein the radio frequency signal controls all of a plurality of the vehicle windows down from the wireless key fob, all of the vehicle windows up from the wireless key fob, all of the vehicle windows down from the driver's door master switch located on a driver's vehicle door, and all of the vehicle windows up from the driver's door master switch located on the driver's side door.

8. The power window control module, according to claim 1, wherein the power window control module is installed inside of a vehicle door.

9. The power window control module, according to claim 8, wherein the enclosure is located within the door switch cover where it will not interfere with functionality of the vehicle door or a plurality of vehicle door components.

10. The power window control module, according to claim 8, wherein the power window control module is installed within four of the vehicle doors of the motor vehicle.

11. The power window control module, according to claim 8, wherein the power window control module is installed within two of the vehicle doors of the motor vehicle.

12. The power window control module, according to claim 1, wherein the motor vehicle is a pick-up truck.

13. The power window control module, according to claim 1, wherein a plurality of the power window control modules communicate with each other.

14. The power window control module, according to claim 1, wherein the power window control module communicates with a wireless key fob with an internal radio transmitter.

15. The power window control module, according to claim 14, wherein the wireless key fob utilizes a radio frequency signal to eliminates running additional conductors throughout the motor vehicle saving time and money.

\* \* \* \* \*